(12) United States Patent
Rohde

(10) Patent No.: US 12,153,845 B2
(45) Date of Patent: Nov. 26, 2024

(54) UNIVERSAL CLOUD PRINTING PROTOCOL

(71) Applicant: City Storage Systems LLC, Los Angeles, CA (US)

(72) Inventor: Henning Korsholm Rohde, Seattle, WA (US)

(73) Assignee: City Storage Systems LLC, Los Angeles, CA (US)

( * ) Notice: Subject to any disclaimer, the term of this patent is extended or adjusted under 35 U.S.C. 154(b) by 0 days.

(21) Appl. No.: 17/940,428

(22) Filed: Sep. 8, 2022

(65) Prior Publication Data

US 2024/0086130 A1 Mar. 14, 2024

(51) Int. Cl.
*G06F 3/12* (2006.01)

(52) U.S. Cl.
CPC .......... *G06F 3/1285* (2013.01); *G06F 3/1205* (2013.01); *G06F 3/1206* (2013.01); *G06F 3/123* (2013.01); *G06F 3/1232* (2013.01); *G06F 3/1236* (2013.01)

(58) Field of Classification Search
CPC .... G06F 3/1285; G06F 3/1205; G06F 3/1206; G06F 3/123; G06F 3/1232; G06F 3/1236
See application file for complete search history.

(56) References Cited

U.S. PATENT DOCUMENTS

| | | | | |
|---|---|---|---|---|
| 7,528,979 B2 * | 5/2009 | Aagesen | ............... | G06F 3/1206 358/1.15 |
| 8,570,550 B2 * | 10/2013 | Pothos | ................. | G06F 3/1238 358/1.15 |
| 9,817,622 B2 * | 11/2017 | Kamath | ................. | G06F 3/1288 |
| 11,385,842 B2 * | 7/2022 | Miyajima | ............. | G06F 3/1232 |
| 2012/0057193 A1 | 3/2012 | Jazayeri et al. | | |
| 2015/0278669 A1 * | 10/2015 | Akiyama | ............... | G06F 3/1222 358/1.14 |
| 2020/0133591 A1 * | 4/2020 | Kaneda | ................... | G06F 3/122 |
| 2020/0195791 A1 * | 6/2020 | Takahashi | .......... | H04N 1/00973 |
| 2021/0048980 A1 * | 2/2021 | Webb | ...................... | G10L 17/24 |
| 2023/0136409 A1 * | 5/2023 | Nogawa | ................ | G06F 3/1258 358/1.13 |
| 2024/0134583 A1 * | 4/2024 | Kohata | ............. | G06K 15/4015 |

FOREIGN PATENT DOCUMENTS

EP 3418878 A1 12/2018

OTHER PUBLICATIONS

International Search Report and Written Opinion issued in Appln. No. PCT/US2023/032059 mailed Dec. 11, 2023. (12 pages).

* cited by examiner

*Primary Examiner* — Helen Zong
(74) *Attorney, Agent, or Firm* — Lerner David LLP

(57) ABSTRACT

The present disclosure provides a system and method of universal cloud printing that unites perspectives of both servers and printers in cloud-based printing. Using printer metadata and explicit constraints allows the server to accommodate various types of printers. Payloads can be consistently printed across various printers having different manufacturers, specifications, formats, or features. Status codes from the printer are defined and initiate a responsive action from the server.

18 Claims, 5 Drawing Sheets ns in the example system of FIG. 1.
UNIVERSAL CLOUD PRINTING PROTOCOL

BACKGROUND

Cloud printers are printers directly connected to a remote server via a print protocol. The design and implementation of such a protocol is difficult and no wide-spread standard exists. So far, such protocols have been developed by printer hardware manufacturers, which has led to systemic shortcomings with the server interaction. For example, existing protocols developed by printer manufacturers tend to be pull-based, slow, and do not support firmware upgrades. Status codes are vague, making it unclear to the remote server what actions should be taken.

Existing push-based protocols typically use MQ Telemetry Transport (MQTT) and can be inflexible and unreliable. When MQTT is used with printing, print results have to be separate MQTT packets, which can lead to problems when working through MQTT brokers. Existing print protocols sometimes perform pipelining of messages, but this can introduce out-of-order printing.

Existing protocols assume certain content formats and printer capabilities, and are typically only applicable only to printers from a particular vendor. Other printers would not print identical payloads the same way, for example, if the paper width was different or if a paper cutter is not present.

BRIEF SUMMARY

The present disclosure provides a system and method of universal cloud printing that unites perspectives of both servers and printers in cloud-based printing. Using printer metadata and explicit constraints allows the server to accommodate various types of printers. Payloads can be consistently printed across various printers having different manufacturers, specifications, formats, or features. For example, print jobs from a remote server can be printed consistently regardless of whether the printer has a different paper width, a paper cutter, etc. Status codes from the printer are defined and initiate a responsive action from the server.

One aspect of the disclosure provides a method of universal printing in a cloud printing network, comprising receiving, at one or more processors, printer metadata from each of a plurality of different types of printers, generating, at the one or more processors, a print job message for a given one of the plurality of different types of printers, wherein the generating comprises using the printer metadata from the given one of the plurality of different types of printers, and sending, by the one or more processors, the print job message to the given one of the plurality of different types of printers.

According to some examples, the method may further include receiving, at the one or more processors, a status from the given one of the plurality of different types of printers, and automatically taking a responsive action in response to receiving the status. The status may indicate a status of the print job and/or a status of the given one of the plurality of different types of printers.

According to some examples, receiving the printer metadata comprises receiving a connection message from each of the plurality of different types of printers, each connection message including the printer metadata for the respective printer. The method may further include establishing, in response to each connection message, a respective ordered bidirectional communication channel between the one or more processors and the respective printers. It may further include initiating, by the one or more processors, a firmware upgrade for the given printer over the communication channel.

According to some examples, the method may further include receiving, from each of the plurality of different types of printers, information indicating options specific to the respective printer. An example of such options is sound. The printer metadata may indicate content format, device properties, capabilities, or other information.

Another aspect of the disclosure provides a system for universal cloud printing, comprising memory and one or more processors in communication with the memory. The one or more processors may be configured to receive printer metadata from each of a plurality of different types of printers, generate a print job message for a given one of the plurality of different types of printers, wherein the generating comprises using the printer metadata from the given one of the plurality of different types of printers, and send the print job message to the given one of the plurality of different types of printers. Moreover, the one or more processors may be configured to receive a status from the given one of the plurality of different types of printers, and automatically take a responsive action in response to receiving the status. The status may indicate a status of the print job, a status of the given one of the plurality of different types of printers, or other status.

Receiving the printer metadata may include receiving a connection message from each of the plurality of different types of printers, each connection message including the printer metadata for the respective printer. The one or more processors may be further configured to establish, in response to each connection message, a respective ordered bidirectional communication channel between the one or more processors and the respective printers. The one or more processors may be further configured to initiate a firmware upgrade for the given printer over the communication channel.

According to some examples, the one or more processors may be further configured to receive, from each of the plurality of different types of printers, information indicating options specific to the respective printer. Such options may include sound. The printer metadata may indicate content format, device properties, capabilities, or other printer information.

DETAILED DESCRIPTION

The system and method of universal cloud printing described herein provides a general, abstract print protocol with an improved printer-server interaction model and semantics. In this protocol, printers expose their own metadata and constraints. Payloads rendered by the server may take into account buffer size, different formats, printer features, etc. Printers may also supply server-focused status codes, wherein each status code triggers a responsive action from the server. In this regard, the printer can control the server in a sense by sending codes to trigger particular actions.

The protocol described herein further provides indirect connection support. The protocol is independent of any concrete transport and encoding, and can support multiple concrete incarnations. The protocol supports both in-band keepalive and no keepalive. The in-band keepalive can be updated dynamically to preserve data usage. The protocol further provides for in-band firmware upgrades, and supports printers that are not connected to the Internet. It further provides for server-controlled remote logging, such that the server can ask the printer to send arbitrary log messages, thereby allowing detailed diagnostics. Moreover, the protocol allows the server to gracefully terminate a connection, thereby reducing reconnect time for a printer if the server needs to disconnected, such as for an upgrade.

Figure 1:
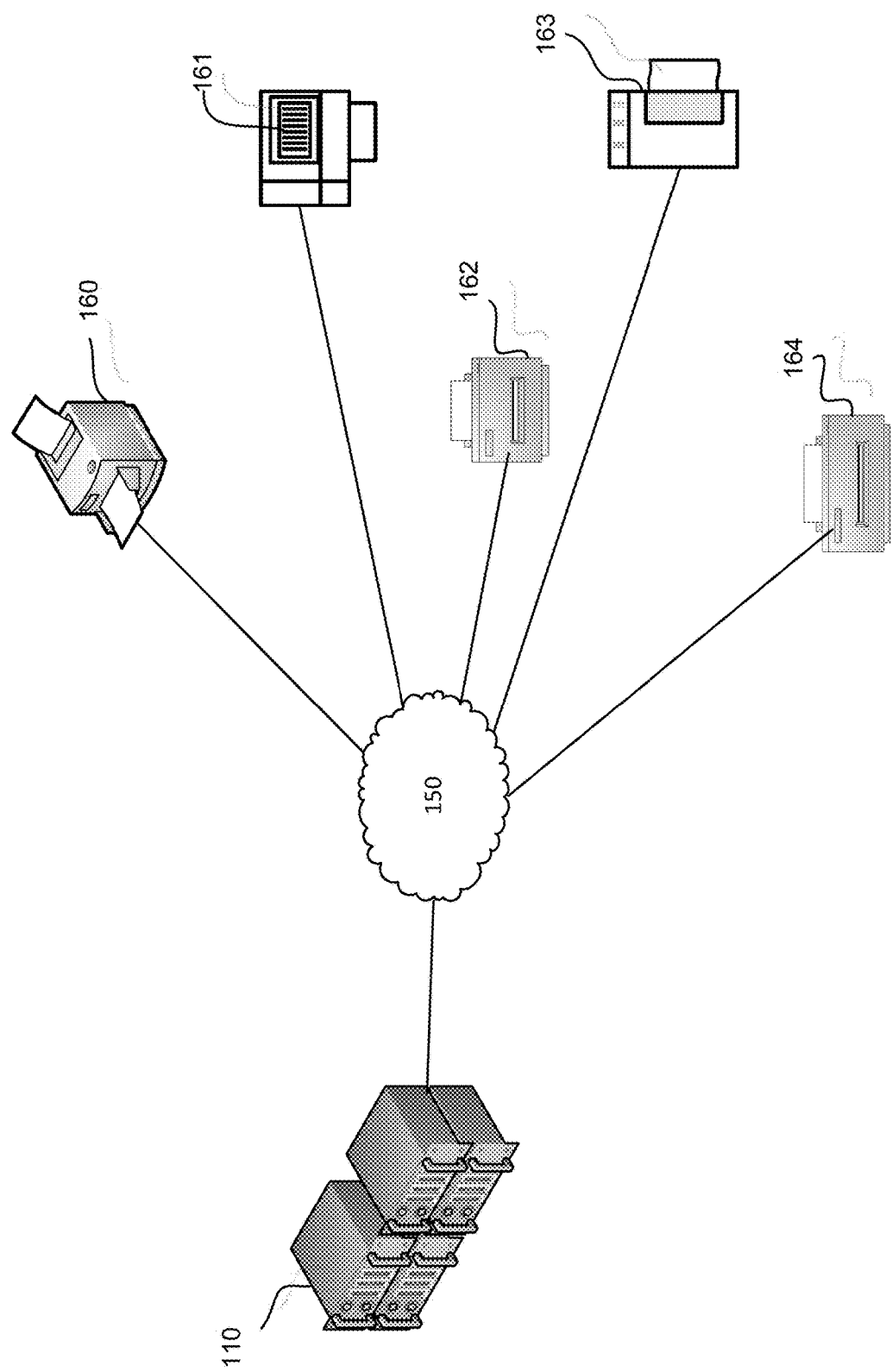
FIG. 1 is a pictorial diagram illustrating an example system according to aspects of the disclosure.

FIG. 1 illustrates an example system, including a server 110 in communication with a plurality of printers 160-164 through a network 150. The printers 160-164 may be wired or wirelessly connected to the server 110 through the network 150. The connection may be direct or indirect, such as though a client computing device (not shown). By way of example only, a printer may be coupled with a tablet through a short range wireless pairing (e.g., Bluetooth) connection, and the tablet may be wirelessly connected with the server 110. The printers 160-164 may include a variety of different types of printers, having different features and capabilities. By way of example, the printers 160-164 may use different sizes or shapes of paper, have different feeds, print using different formats or fonts, leave different amounts of space after printing, have a cutter for facilitating tearing of paper, etc. Each printer 160-164 may be physically located at a different geographic location. For example, each printer 160-164 may be located within a different business building, wherein each different business building can be in a same or different cities. While several printers 160-164 are shown, it should be understood that any number of printers may be utilized in the system in communication with the server 110. Similarly, while the server 110 is illustrated as several computing devices, such as in a rack, the server 110 can include one or any number of computing devices in a same or different location. For example, the server 110 can be a plurality of servers in a distributed computing environment. The server, network, and printers are described in further detail in connection with FIG. 2.

Figure 2:
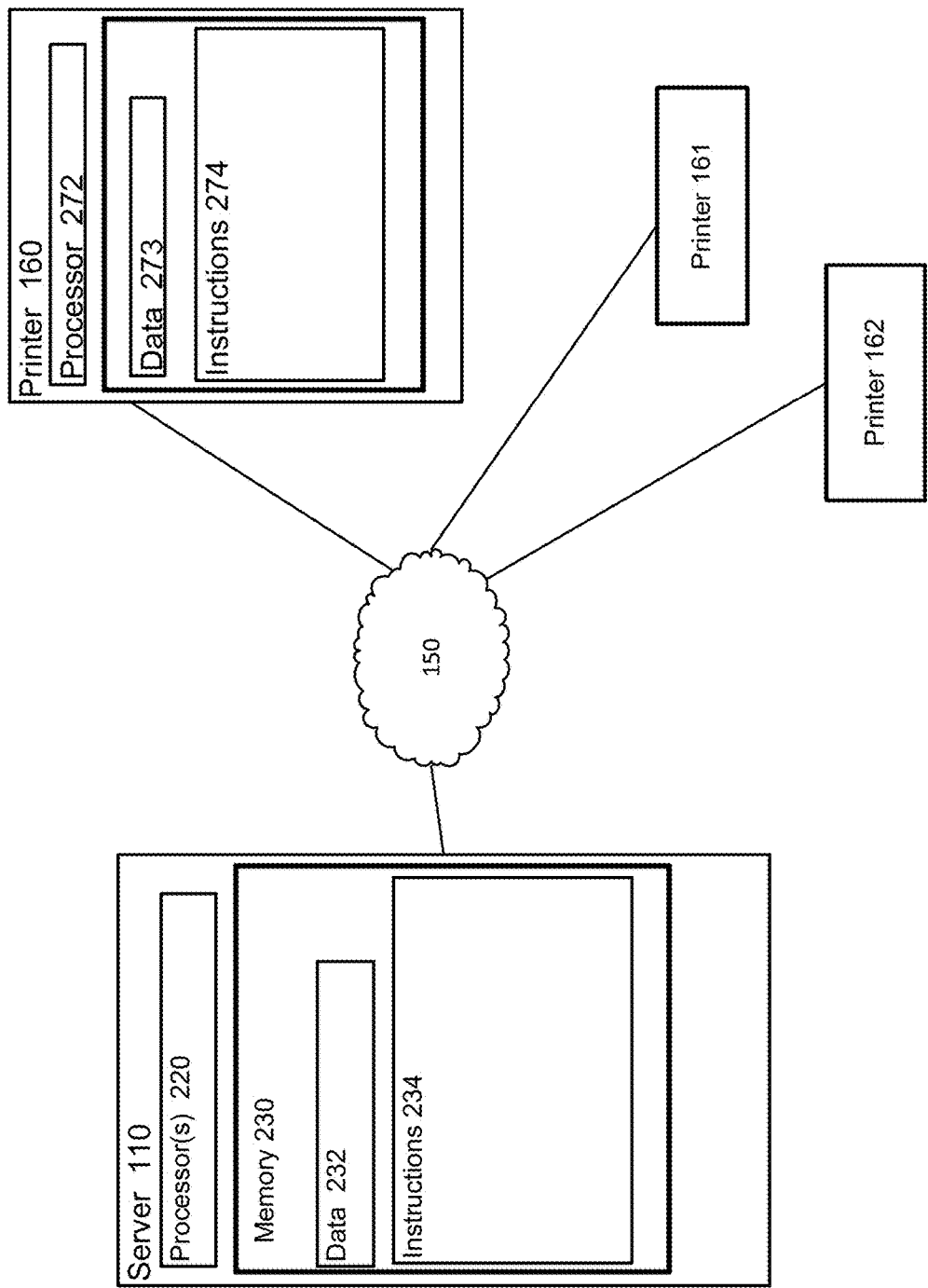
FIG. 2 is a block diagram illustrating details of components in the example system of FIG. 1.

FIG. 2 illustrates details of the server 110, printers 160-162, and network 150. Each server 110 can contain one or more processors 220, memory 230 and other components typically present in server computing devices. Memory 230 of each of server 110 can store information accessible by the one or more processors 220, including instructions 234 that can be executed by the one or more processors 220.

Memory 230 can also include data 232 that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The instructions 234 can be any set of instructions to be executed directly, such as machine code, or indirectly, such as scripts, by the one or more processors. In that regard, the terms "instructions," "application," "steps," and "programs" can be used interchangeably herein. The instructions can be stored in object code format for direct processing by a processor, or in any other computing device language including scripts or collections of independent source code modules that are interpreted on demand or compiled in advance. Functions, methods, and routines of the instructions are explained in more detail below.

The instructions 234 may be executed by the one or more processors 220 to implements a universal cloud printing protocol. According to this protocol, printers metadata and constraints are accessible by the server. Such metadata may indicate, for example, buffer size, different formats, printer features, etc. In this regard, the server can send print jobs to each of a variety of different printers while accommodating the specific features and constraints of each of the different printers. Moreover, printers may supply status codes to the server, wherein each status code triggers a responsive action from the server. In this regard, the printer can control the server in a sense by sending codes to trigger particular actions.

Data 232 may be retrieved, stored or modified by the one or more processors 220 in accordance with the instructions 234. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 220 can be any conventional processors, such as a commercially available central processing unit (CPU). Alternatively, the processors can be dedicated components such as an application specific integrated circuit (ASIC) or other hardware-based processor. Although not necessary, one or more of servers 110 may include specialized hardware components to perform specific computing processes faster or more efficiently.

Although FIG. 2 functionally illustrates the processor, memory, and other elements of server 110 as being within the same block, the processor, computer, computing device, or memory can actually comprise multiple processors, computers, computing devices, or memories that may or may not be stored within the same physical housing. For example, the memory can be a hard drive or other storage media located in housings different from that of the server 110. Accordingly, references to a processor, computer, computing device, or memory will be understood to include references to a collection of processors, computers, computing devices, or memories that may or may not operate in parallel. For example, the server 110 may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, communicating information over network 150.

Each of the computing devices 110, 160-162 can be at different nodes of a network 150 and capable of directly and indirectly communicating with other nodes of network 150. Although only a few computing devices are depicted in FIG. 2, it should be appreciated that the system can include a large number of connected computing devices, with each different computing device being at a different node of the network 150.

The network 150 and intervening nodes described herein can be interconnected using various protocols and systems, such that the network can be part of the Internet, World Wide Web, specific intranets, wide area networks, or local networks. The network can utilize standard communications protocols, such as Ethernet, WiFi, HTTP, protocols described in IEEE 802.88, cellular technology (such as GSM, CDMA, UMTS, EV-DO, WiMAX, LTE, etc.) protocols that are proprietary to one or more companies, and various combinations of the foregoing. Although certain advantages are obtained when information is transmitted or received as noted above, other aspects of the subject matter described herein are not limited to any particular manner of transmission of information.

As an example, each of the servers 110 may include web servers capable of communicating with a storage system as well as printers 160-162 via the network 150. For example, one or more of server computing devices 110 may use network 150 to transmit and present information to a user on a ticket or paper printed by the printer 160, and/or on a display. In this regard, printers 160-162 may be considered client computing devices and may perform all or some of the features described herein.

According to some examples, each printer may be connected to the network 150 through a client computing devices (not shown) that is configured similarly to the server computing devices 110, with one or more processors, memory and instructions as described above. Such client computing devices may include personal computing devices intended for use by a user, and have all of the components normally used in connection with a personal computing device such as a CPU, memory (e.g., RAM and internal hard drives) storing data and instructions, a display such as display (e.g., a monitor having a screen, a touch-screen, a projector, a television, or other device that is operable to display information), and user input device (e.g., a mouse, keyboard, touch-screen, or microphone). In some examples, the client device may include a microphone for capturing audio input, such as voice commands. Although the client computing devices may each comprise a full-sized personal computing device, they may alternatively comprise mobile computing devices, such as phones, tablets, or any other mobile device.

According to other examples, the printers 160-162 may be directly connected to the network 150. In either example, the printers 160-162 may each include one or more processors 272 and a memory including data 273 and instructions 274, similar to the server 110.

Metadata

Each of the printers 160-162 can make printer metadata available to the server 110. For example, printers 160-162 each send metadata to the server 110. In this regard, print tickets can be rendered correctly regardless of printer type, respecting printer capabilities and technical limitations. For example, the metadata states which payload format the printer supports. An ESC/POS printer does not support PNG or TSPL, for example, and will (correctly) consider such a payload invalid. The server may have different rendering logic for each type of payload. As another example, printers support complex formats to different degrees. The metadata may inform the server as to what the printer supports, such that the server can avoid using something incorrect. For example, ESC/POS has an instruction to draw a QR code, but if this format is not supported by the printer, the QR code would need to be drawn manually and printed using many instructions. As a further example, if the metadata from the printer indicates that the printer does not have a physical paper cutter, the server may omit a PAPERCUT instruction and instead instruct to output additional whitespace to allow room for manual tearing.

Figure 3:
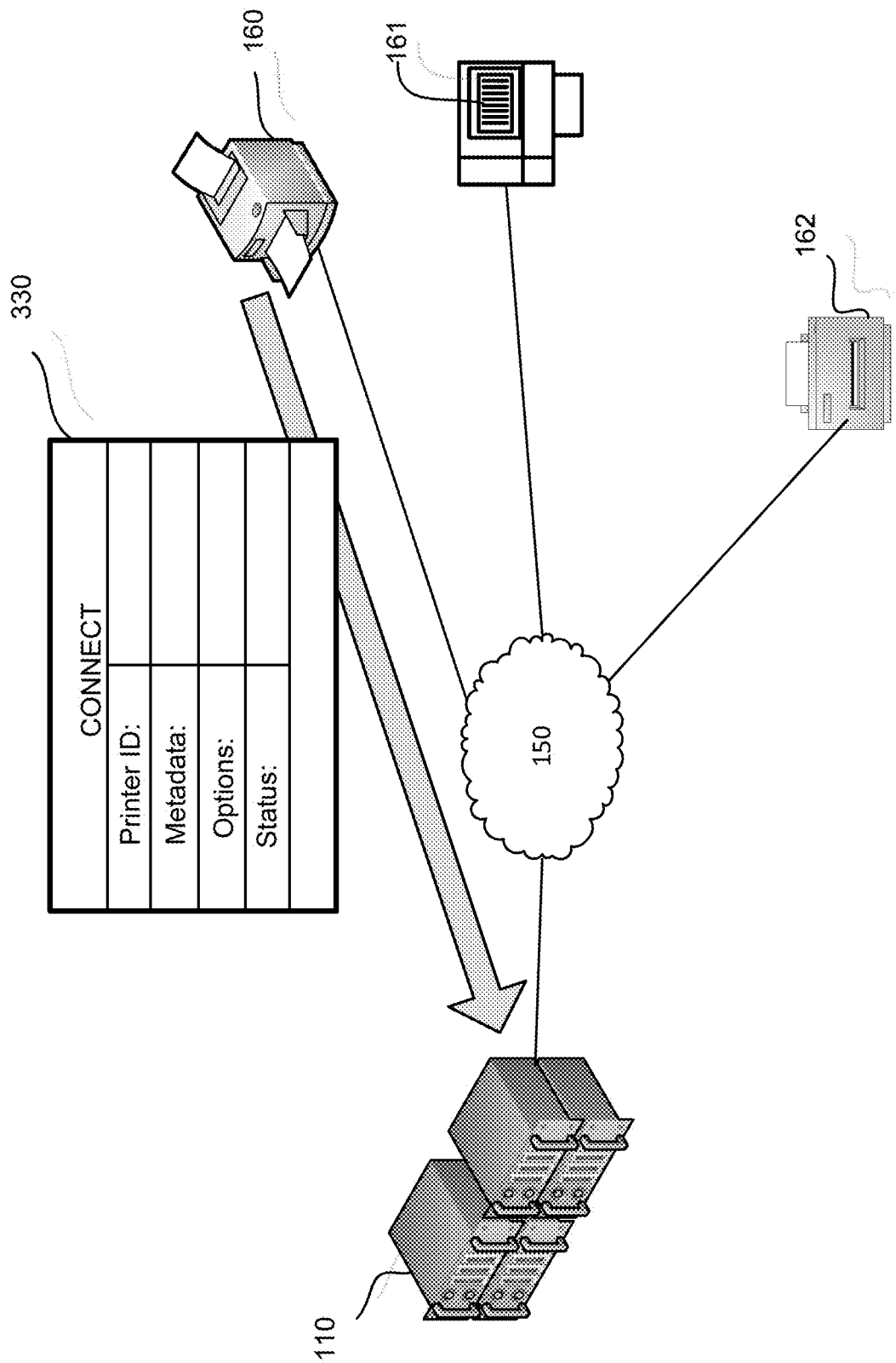
FIG. 3 illustrates an example of establishing a connection between a printer and a server using a universal cloud printing protocol described herein.

The metadata may be sent, for example, in a message such as in a payload. According to some examples, the metadata may be sent by the printer in an initial connection request message. For example, FIG. 3 illustrates an example where the printer 160 sends a connection request message 330 to the server 110. The connection request message 330 includes metadata for the printer. It may further include options and status. According to other examples, the metadata may be sent in response to a request by the server 110. For example, the server 110 may send a remote procedure call (RPC) to any one or more or all printers 160-162, at a same or different times, requesting the printer metadata.

Printer metadata may include, for example, device information, content formats and limitations, and capabilities. Device information may include model, serial number and firmware version. Content formats and limitations may include, for example, width and size limit in bytes. The limit in bytes may depend on transport/encoding and does not have to equal a physical limit. It applies to the sum of all outstanding jobs, not each job. Capabilities may include any of a variety of possible features or functions that can be included in the printers 160-162.

With regard to device information, the universal cloud printing protocol captures basic device information to facilitate detailed fleet management and monitoring. The vendor, model and hardware version can be used to find a stock photo of a printer, for example, towards a better customer experience. The serial number, if present, is only expected to be unique for a particular vendor, and is expected to remain the same even if the printer is factory reset. Firmware versions can be used to decide whether a given printer should be upgraded.

The universal cloud printing protocol can represent firmware versions across potentially multiple domains for printers that do not use a single monolithic payload. For example, the available voices for sound might be updatable independently of the main firmware.

With regard to content formats, the universal cloud printing protocol may be content-agnostic, but supported content and relevant features and limitations may still be represented explicitly. As new formats are developed, the universal cloud printing protocol may be updated to accommodate the newly developed formats. Content type defines the format. In some examples, the universal cloud printing protocol may use Internet Assigned Numbers Authority (IANA) content types. The printer can also specify a maximum size limit, which may be derived from a buffer size of the printer memory. The limit is applied to the unencoded content and allows for encoding and message overhead if needed. A long print ticket may be broken into separate jobs to comply with the size limit.

Some examples of content formats may include image format, ESC/POS, TSPL/TSPL2, etc. With image format, graphical images may be encoded as png, tiff, etc. ESC/POS is a widely-used printer command language. ESC/POS is a customizable format and the specific commands supported may vary significantly across printers. It includes non-standard or dynamically updatable codepages. Some printers may support dynamically updated character sets via a firmware domain TSPL/TSPL2 is a widely used language label, with an evolving format. If new labels are loaded in the printer, the dimensions may need to be updated accordingly.

As one example of capabilities, some printers 160-162 may include a cutter, such that when executing a print job, a long roll of paper is fed to the printer. When printing for the print job is completed, a tool within the printer detaches the portion of the long roll of paper on which the print job was printed from the rest of the long roll of paper. Other printers that do not have a cutter may require that the paper be torn off by a user at the end of a print job. Such printers may need to expel extra paper at the end of print job to leave extra blank space, thereby allowing room for tearing the paper without accidentally tearing off a portion on which the print job was printed.

As another example of capabilities, some printers 160-162 may include sound, such as audio input and/or output capabilities. For example, some printers may be capable of accepting voice commands. Some printers may be capable of providing notifications or other information via audio output, such as a tone, beep, verbal notification, etc. Some printers have sound capabilities and allow playing pre-defined voices for a job. For example, a "new order" voice command may accompany a job where a new order, to be printed, is placed. Each voice may have extra context for more precise voices, if available, such as from which platform (e.g., application-based food delivery service platform) a new order arrives. The set of voices and contexts is open-ended. A sound-capable printer maintains a volume setting separately from voices. The list of supported voices does not include supported contexts. The printer will fall back to a generic voice message if the provided context is not supported. Supported voices may potentially be updated over-the-air.

While the foregoing provides a number of examples of metadata, it should be understood that other types of printer metadata may be included. The servers 110 may use the metadata from the printers 160-162 to adapt commands and other communications sent to the printers. For example, for print jobs sent to a given one of the printers 160-162, the server may accommodate the format, capabilities, etc. of the printer when sending the print job.

Printer Options

Figure 4:
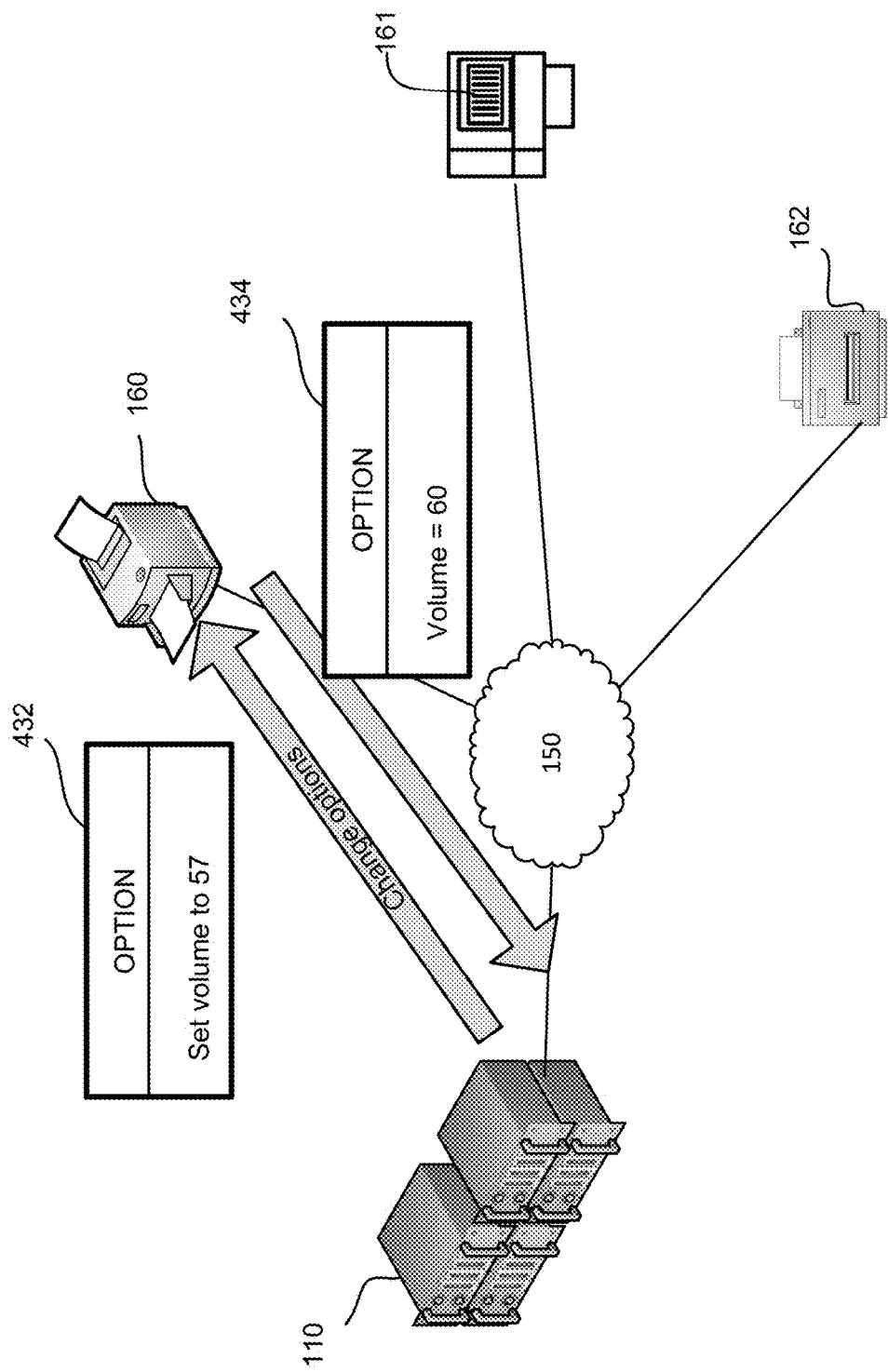
FIG. 4 illustrates an example of the server prompting adjustment of printer options according to aspects of the disclosure.

Options are printer settings that are changeable. The server 110 can request the printer 160-162 to change options. For example, as shown in FIG. 4, the server 110 may send a message to any one or more of the printers 160-162 instructing the printer to change options. The printer may also change the options itself due to direct user input, for example. One example of changing options relates to volume control. For example, if the printer 160 supports sound, the printer 160 may include a volume control that can be used to adjust the volume of sound that is output. For example, the server 110 may instruct the printer 160 to output sound at some percentage of maximum volume. This may be useful if the server 110 determines that audio output initiated by the server 110 and sent to the printer 160 are not being acknowledged or otherwise responded to. For example, if the server 110 determines that the audio output is not being heard, the server 110 can instruct the printer 160 to raise its volume level for the output. Such determination at the server 110 may be based on logs or other information provided by the printer 160. The printer 160, in response, may make the suggested option change, make the option change to different specifications, or make no option change. For example, as shown in FIG. 4, the server 110 requests that the printer 160 adjust its volume to 57%. In response, the printer 160 may adjust its volume to 57%, adjust its volume to a different percentage, or make no adjustment. For example, the printer may only be capable of adjusting volume with limited granularity, such as if it had five volume levels above 0-20%, 40%, 60%, 80%, 100%. In this regard, the printer may not be capable of setting its volume to 57% as instructed, and instead round up to 60%. In the example illustrated, the printer 160 adjusts its volume to 60%.

Printer Status

Each printer 160-162 may provide the server 110 with its status. The printer status informs the server 110 of what it is capable of doing and, if not operational, what it needs to become operational again. A high-level status captures the overall stance of the printer, such as whether or not it is ready to accept a next print job from the server 110. Example high-level status codes may include:

| Code | Description |
| --- | --- |
| INIT | The printer is initializing (or busy) and not ready to print. The server should not send it any jobs. INIT is the expected initial state on CONNECT and after it receives UPGRADE. |
| READY | The printer is ready to print. |
| BLOCKED | The printer is blocked and not ready to print. The server should not send it any jobs. The problem is specified by an error code. |

Error codes may indicate specific problems with a particular printer. Example error codes include:

| Code | Description |
| --- | --- |
| HARDWARE | Printer-specific hardware problem. The user may attempt a power-cycle/wait, but replacement might be needed. |
| OVERHEATED | Printer overheated: the user should turn it off or let it be and maybe move it to a cooler location. |
| PAPER_NOT_READY | COVER_OPEN or OUT_OF_PAPER: user must ensure paper is loaded correctly. Use if the printer cannot distinguish the two cases. |
| COVER_OPEN | Cover open: user must close cover. |
| OUT_OF_PAPER | Out of paper: user must refill paper. |

Warning codes may identify statuses in which there is not yet an error, but an error may soon occur if an action is not taken. By way of example, such warning codes may include:

| Code | Description |
| --- | --- |
| LOW_PAPER | Low paper: user to do nothing until it turns into an OUT_OF_PAPER error. Mainly informational. |
| LOW_SIGNAL | Low signal strength: mainly for Bluetooth printers or 4G/5G-connected printers. The user may be able to improve signal strength by moving the printer. |

Communication Channel/Transport and Encoding

The universal cloud printing protocol presented in this disclosure defines a print protocol between a server and a printer over an ordered bi-directional communication channel, such as MQTT. To support a wide range of setups, the channel may optionally offer authentication. A connection may be initiated by the printer 160 and may be gracefully torn down by either the server 110 or the printer 160. Once connected, the server 110 will push print jobs one at a time quickly and reliably, handling print failures and retry as needed.

The protocol described herein further provides indirect connection support. The protocol is independent of any concrete transport and encoding, and can support multiple concrete incarnations. The universal cloud printing protocol is transport and encoding agnostic. The protocol applies to any ordered, bi-directional transport, such as MQTT, Web-sockets or GRPC, where messages are encoded in some structured, serializable format, such as JSON, XML or Protobuf. The universal cloud printing protocol thereby supports pragmatic choices of transports and encoding, such as MQTT, GRPC, etc. Using MQTT, the printer connects directly over MQTT and encodes messages as JSON. Using GRPC, the printer connects over GRPC and encodes messages as Protobuf. This may be particularly useful for printers that are connected via an intermediate device. Printer authentication may be handled by the transport or in-band. For example, username and password authentication may be used, such as in MQTT.

When using MQTT as transport, MQTT may also be used for keepalive and basic authentication. During initial connection, a vendor and serial encoded username may uniquely identify the printer and must match the printer metadata in a subsequent connect message. Messages are encoded as JSON and sent on topics, including a printer-to-server topic and a server-to-printer topic. The printer must subscribe to the server-to-printer topic before sending the connect message. Aside from print messages, the printer may send ping requests to maintain the MQTT keepalive as needed.

When using GRPC as transport, proto3 encoding and bi-directional streaming may be used, as well as in-band keepalive and authentication.

According to some examples, one or more universal cloud printing sessions may be embedded into another protocol. For example, a tablet with multiple Bluetooth printers could use a single GRPC connection and multiplex multiple universal cloud printing streams along other tablet data.

The flexibility of being transport and encoding agnostic allows indirect connections using whatever transport/encoding appropriate for the link. A client computing device, such as a tablet, can multiplex the universal printing protocol for multiple locally attached printers.

Messages

A connection or session is an ordered, reliable, bi-directional stream of messages. The universal cloud printing protocol defines messages between a server and a printer, organized by group. Either the server 110 or the printers 160-162 may initiate a specific message. Each connection may be initiated by the printer 160-162 and may be completed through a handshake. For example, the printer 160 may send an authentication message "AUTH" followed by a connection message "CONNECT" to the server 110. The server 110 may respond with an acknowledgement "ACK" to both if accepted. If not accepted, the server 110 may respond with a disconnection message "DISCONNECT" and terminate the connection without processing further messages. Once the initial handshake is complete, the connection is established and either side may send messages. According to some examples, the printer may opportunistically send messages before receiving the acknowledgement for the connection message, with the expectation that the connection will be established successfully.

Each message may contain a sequential message identifier, a timestamp, and a single payload organized by group. The message identifiers are sequential in each direction.

Control messages handle connection and flow control aspects, notably connection establishment, liveness and termination.

Failure codes are high-level localizable descriptions of why some action was taken or not be taken. Such codes may be used to determine if a connection request should be rejected or if a connection should be terminated. Examples of such failure codes include:

| Code | Description |
| --- | --- |
| connectivity | Temporary connectivity issue. |
| invalid | Matching operation is not well-formed or valid. |
| internal | Internal error. |
| unavailable | Temporary availability issue, such as a server restart. |
| unsupported | Matching operation is not supported. |
| unauthorized | Matching operation is not authorized, usually AUTH. |

Referring back to FIG. 3, the printer 160 sends a connection request 330, such as a CONNECT message, to the server 110 to establish a new connection. The connection request 330 may include identification information for the printer, as well as initial printer metadata, options, and status. The status is expected to be an initial or "INIT" status while the printer initializes, but a printer may also connect in READY or BLOCKED status.

According to some examples, the connection request 330 may be preceded by an authentication message, "AUTH". The AUTH message allows in-band basic authentication. Basic authentication is used to allow on-demand registration of new printers by the server 110. The AUTH message may include vendor and serial number, which should match the device information in the subsequent CONNECT.

The server 110 may respond to the connection request 330 either affirmatively or negatively. A negative response may include a REJECT or DISCONNECT message. The REJECT message indicates that the referenced message was not accepted. The REJECT message may include a failure code and may be followed by a DISCONNECT message. In some instances, REJECT messages may be used after connection has been established, such as if a message is not understood.

The DISCONNECT message indicates the immediate termination of the connection. The message may include a failure code.

An affirmative response from the server 110 to the connection request from the printer 160 may include an acknowledgement, or ACK. An ACK message acknowledges that all messages up to and including the referenced message have been correctly received, but not necessarily completed if the corresponding action is not immediate. In addition to being used to establish a connection, the ACK message may be used to acknowledge any other type of message.

During connection between the server 110 and the printer 160, a variety of other types of messages may be sent. One example is a keep-alive message. If sent by the printer 160, a KEEPALIVE message indicates the current setting for keeping the printer in an active or responsive mode, or from keeping the printer from going to a sleep or off mode. If sent by the server 110, the KEEPALIVE indicates a suggested setting, which the printer 160 can use or not. A suggestion of zero duration may be an instruction to disable keepalive. For any KEEPALIVE setting sent by the printer 160, the server 110 should observe it.

Another example message is a FLUSH message, which triggers an acknowledgement by the recipient. It ensures that messages are processed and is used by the printer periodically to satisfy keep-alive, but can be sent at any time by either the printer or the server. In that regard, the FLUSH message can act as a "ping". The FLUSH message can also be used for time synchronization by the printer, since there is no processing on the server side and an acknowledgement is sent immediately. The time difference between FLUSH and ACK is thus close to the roundtrip time and the server timestamp+½ roundtrip time can be used as the new printer time.

An UPDATE message may be used to update printer metadata and status, whenever changed. According to some examples, the status, metadata, or both can be provided when either the status or metadata is updated. While in some examples full metadata may be sent with the update, in other examples only the changed portions of the metadata may be sent.

An OPTION message may be sent by the printer to update the server regarding one or more printer settings if such settings changed after the initial CONNECT message. The message may include all options of the printer, or only the options that have changed.

FIG. 4 illustrates an example where OPTION message 432 is sent by the server 110 to the printer 160. If sent by the server 110, the OPTION message may indicate a suggested setting, which the printer can use or not. In the example shown, the server 110 suggests that the printer 160 adjust its volume to 60%. If the printer 160 makes the requested change, the printer may send another OPTION message 434 to the server 110 to indicate its new state. According to some examples, the printer 160 may make a change but not to the specifications of the suggestion from the server. By way of example only, if the server suggests a volume increase from 20% to 60%, the printer may instead increase the volume to 40%.

An UPGRADE message may be sent by the server to instruct the printer to perform a self-paced firmware upgrade. The self-paced firmware allows the printer to control the download, thereby accommodating the printer's buffer size limitations for firmware.

Job messages may be exchanged between the server 110 and the printers 160-162, for example, to instruct the printers 160-162 to perform print jobs and to receive, at the server 110, updates from the printers 160-162 on the status of the jobs. Job messages may include instructions by the server to the printer to perform a printing action. For example, a PRINT message directs the printer to print a ticket. This can also be self-paced for large tickets to avoid breaking the print job into multiple tickets. The PRINT message may include a unique job identifier, content, control options, expiration time, etc. The control options may be based on the metadata received from the particular printer to which the job will be sent, such that the PRINT message is customized to adapt the print job to the specific capabilities of the printer.

The unique job identifier may be used by the printer to detect duplicates. For example, if the printer 160 receives multiple PRINT messages having the same unique identifier, the printer 160 may determine that the messages are duplicates. The unique identifier may further be used for matching printer response messages to an instruction message from the server. For example, when the printer 160 receives the instruction message, it may send an acknowledgement that include the unique identifier from the instruction message. When the printer 160 completes the instructions included in the instruction message, it may send a status update that references the unique job identifier to let the server 110 knows that the print job has been completed. If alternatively the printer 160 experiences an error, it may send an error message including the unique job identifier to the server 110. The content may be a payload for the printer, such as instructions to the printer indicating what should be printed for the print job. Control options may include metadata for controlling printer behavior for the job. For example, the control options may include an expiration time for the print job. If the printer holds the job beyond that time, it may complete the job as EXPIRED. Further example control options include a voice to use, or a delay/hold such as where the printer only prints the job when a user provides manual confirmation.

The expiration time may indicate a time period during which the printer must execute the print job. For example, the expiration time may set a time limit, after which the printer should discard the print job.

According to some examples, a print result message may be sent when the print job has been completed or otherwise terminated. For example, a PRINTRESULT message may be an asynchronous response to a PRINT message, sent after the request has been fully processed. The PRINTRESULT message may include a job status that informs the server what has transpired. The server may in turn use the job status to determine a next action.

Job status may be indicated with, for example, status codes, wherein each status code informs the server towards its next action. Example status codes may include:

| Code | Description |
| --- | --- |
| PRINTED | Job printed successfully. |
| GARBLED | Job arrived garbled, such as a failed checksum or data corruption likely incurred during transport. Did not attempt to print. The server should generally re-submit the job, using the same job identifier. |
| INVALID | Job arrived correctly, but the content is not supported. Did not attempt to print. The server should discard the job. |
| FAILED | Job arrived correctly and attempted to print, but did not succeed. The printer would typically first update itself to a BLOCKED state if this happens for mechanical reasons. Unclear outcome: none or part of the ticket may have been printed. The server may optionally re-submit, using the same job identifier, if the printer is READY. |
| EXPIRED | Job expired. Did not attempt to print. The server should discard the job. |
| DUPLICATE | Job is a duplicate of one that resulted in PRINTED. |

Keep-Alive

The universal cloud printing protocol described herein supports both in-band keep-alive and no keep-alive. The keep-alive parameter enables the server to determine when a connection is no longer valid. The keep-alive mechanism does this by sending low-level probe messages to see if the other side responds. If it does not respond to a certain number of probes within a certain amount of time, then it assumes the connection is dead and the process using the socket will then detect this through an error indication. The in-band keep-alive can be updated dynamically to preserve data usage—notably, at night nothing is printed—and is thus adaptive.

In typical systems, the keep-alive setting is usually fixed when a connection is established. For example, in MQTT a ping request message and response may be sent in periodic time intervals, such as every 20 seconds, as a heartbeat. If a message is not received by either the server or printer within 30 s, the connection may be considered dead. The universal cloud printing protocol described herein allows the printer to change the keep-alive interval, such as by increasing the interval when it is less important to reconnect quickly and decreasing the interval when quick reconnection is more important. For example, for a printer in a restaurant on a night when the restaurant is closed and no jobs are printed, it may not be important to quickly reconnect. Accordingly, the server may propose to increase the keep-alive interval on such nights when the restaurant is closed, such as by increasing the interview to 10 minutes. When orders are received again when the restaurant reopens, the server may initiate restoration of the keep-alive interval to 20s. In this regard, the cloud printing protocol saves bandwidth intelligently, by sending fewer ping requests during periods of time when printer inactivity is expected.

In-Band Firmware Upgrade

The universal cloud printing protocol supports in-band firmware upgrade. Typically, to upgrade firmware a printer may be sent a uniform resource link (URL) to download a file, but the printer may not be physically capable of downloading the file, such as if access to the URL is blocked. The universal printing protocol described herein allows the printer to perform a self-paced download over the same connection that it has already established with the server. Accordingly, a separate Internet connection is not needed, and therefore the upgrade may more reliably be performed. For example, the protocol uses in-band payloads, chunking larger payloads into smaller ones when needed, for the printer to decide how quickly to read.

In-Band Remote Logging

According to some examples, the server 110 may maintain a log of messages from the printers 160-162. The server may store the printer log messages in a database for example, or record them as part of its own logs. In this regard, diagnostic data from the printer may be captured and analyzed for debugging. According to other examples, each printer 160-162 may maintain its own log of its operations, such as messages received, print jobs, status, etc. The server can ask the printer to send arbitrary log messages. In this regard, the server can perform detailed diagnostics for the printer. For example, if an error occurs at the printer 160, the server 110 can review logs to identify when the printer 160 began malfunctioning, what operations it was performing when it began malfunctioning, etc. The server 110 may use this information to further determine what is causing the malfunction, and potentially how it can be resolved.

Server Side Disconnect

The universal cloud printing protocol allows the server to gracefully terminate a connection with any give printer. This reduces reconnect time for the printer if the server needs to be upgraded, for example.

Figure 5:
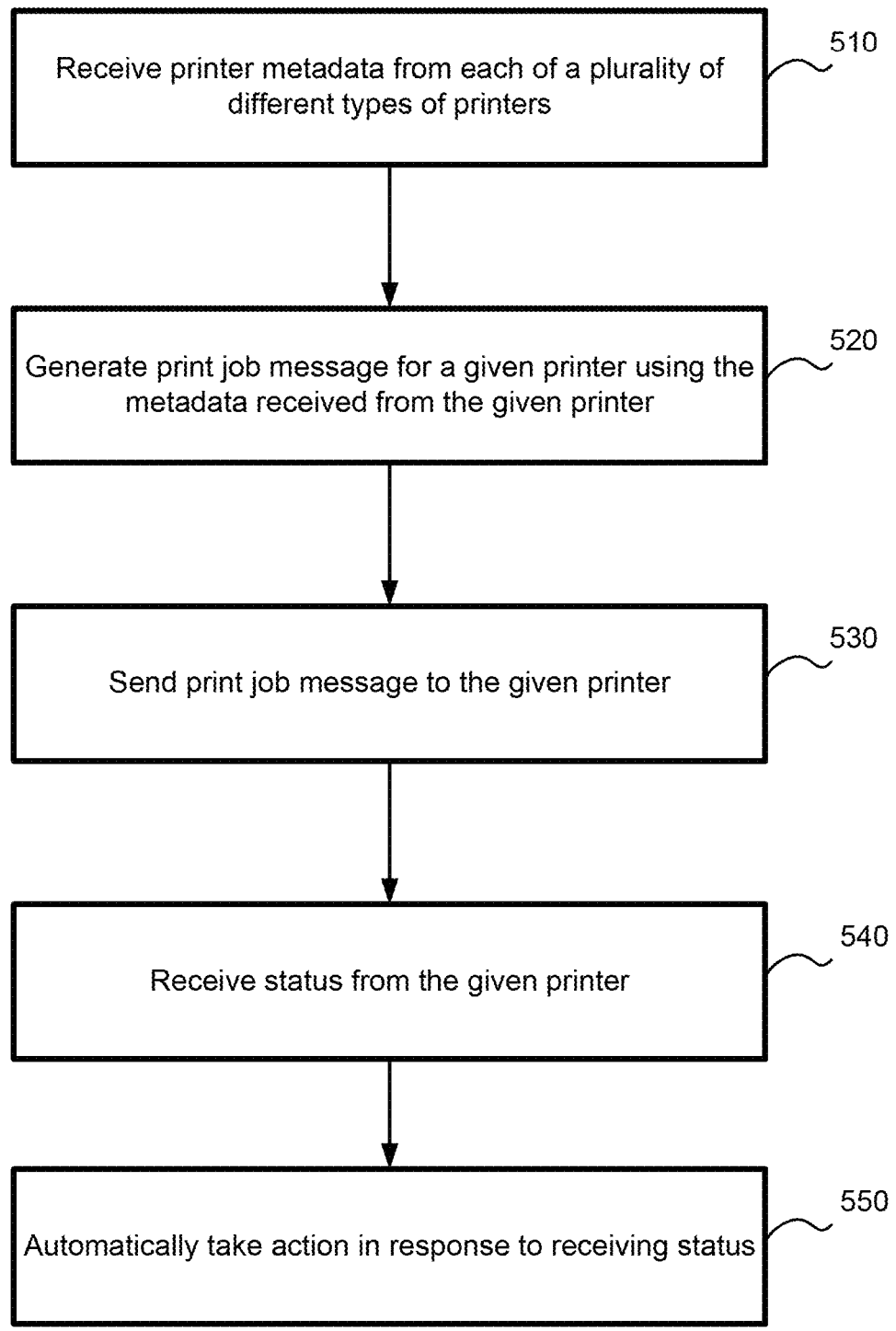
FIG. 5 is a flow diagram illustrating an example method according to aspects of the disclosure.

FIG. 5 illustrates an example method of operation of a system using the universal cloud printing protocol. While the operations are described in a particular order, it should be understood that the operations may be performed in a different order or simultaneously. Moreover, operations may be added or omitted.

In block 510, printer metadata from each of a plurality of different types of printers is received at one or more processors, such as cloud printing servers. The printer metadata may include, for example, device information, content and format limitations, capabilities, etc. for the printer. The metadata may be provided during establishment of a connection between each given printer and the server, and/or thereafter. According to some examples, the metadata may be periodically provided, such as every few hours, once a day, every few days, etc. According to other examples, the metadata may be provided in response to events occurring at the printer, such as after a firmware upgrade.

In block 520, the one or more processors generates a print job message for a given printer using the respective metadata received from the given printer. By way of example, the one or more processors may receive an order from a customer, where the order should be printed at a printer in a remote facility that can fulfill the order. The one or more processors may generate a message with a payload including print instructions that are adapted to the content and format limitations, capabilities, etc. of the given printer. For example, if the metadata states which payload format, content, and capabilities the printer supports, the server can generate instructions that are consistent with the supported format, content, and capabilities.

In block 530, the one or more processors sends the print job message to the given printer. In response, the given printer may execute the print job, or attempt to execute the print job.

In block 540, the one or more processors receives a status from the given printer. The status may be sent automatically by the given printer in response to completion of the print job, or in response to an error occurring while executing the print job. By way of example, the status may indicate to the one or more processors that the print job was successfully completed. In other examples, it may indicate that the job was successfully completed, but also include a warning, such as an indication that the printer is running out of ink, paper, battery power, etc. In other examples, the status may indicate that the print job failed prior to completion, and may include details of why the print job failed. Some examples of failure may include a rejection of the print job by the printer before it attempts to execute the print job.

In block 550, the one or more processors may automatically take a responsive action upon receiving the status. For example, the one or more processors may store a table or other data structure mapping potential status types to corresponding actions. In some examples, the responsive action may depend on the status in combination with other information, such as printer metadata, server conditions, etc. By way of example, if the status indicates that the print job failed because the given printer was out of paper, the one or more processors may responsively send an alert to the given printer that paper must be refilled and then resends the print job. As another example, if the status indicates that the print job was completed successfully, the one or more processors may responsively send a subsequent print job. While these are merely a few examples, it should be understood that any of a multitude of responsive actions can be performed in response to various statuses or combinations of status and other information.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of universal printing in a cloud printing network, comprising:

receiving, at one or more processors, printer metadata from each of a plurality of different types of printers;

generating, at the one or more processors, a print job message for a given one of the plurality of different types of printers using the printer metadata from the given one of the plurality of different types of printers;

receiving, from the given one of the plurality of different types of printers, logs of operations of the given one of the plurality of different types of printers;

determining, by one or more processors, whether to change options for the given one of the plurality of different types of printers by analyzing the received logs of the operations from the given one of the plurality of different types of printers;

sending a message to the given one of the plurality of printers based on the determination, wherein the message indicates a change to the options for the given one of the plurality of printers;

sending, by the one or more processors, the print job message to the given one of the plurality of different types of printers; and updating a universal cloud printing protocol executed by the one or more processors when one or more of the plurality of different types of printers utilizes a newly developed content format.

2. The method of claim 1, further comprising:

receiving, at the one or more processors, a status from the given one of the plurality of different types of printers; and automatically taking a responsive action in response to receiving the status.

3. The method of claim 2, wherein the status indicates a status of the print job.

4. The method of claim 2, wherein the status indicates a status of the given one of the plurality of different types of printers.

5. The method of claim 1, wherein receiving the printer metadata comprises receiving a connection message from each of the plurality of different types of printers, each connection message including the printer metadata for the respective printer.

6. The method of claim 5, further comprising establishing, in response to each connection message, a respective ordered bidirectional communication channel between the one or more processors and the respective printers.

7. The method of claim 6, further comprising initiating, by the one or more processors, a firmware upgrade for the given printer over the communication channel.

8. The method of claim 1, wherein the options comprise sound.

9. The method of claim 1, wherein the printer metadata indicates content format.

10. A system for universal cloud printing, comprising:
memory; and
one or more processors in communication with the memory, the one or more processors configured to:
receive printer metadata from each of a plurality of different types of printers;
generate a print job message for a given one of the plurality of different types of printers using the printer metadata from the given one of the plurality of different types of printers,
receive, from the given one of the plurality of different types of printers, logs of operations of the given one of the plurality of different types of printers,
determine whether to change options for the given one of the plurality of different types of printers by analyzing the received logs of the operations from the given one of the plurality of different types of printers,
send a message to the given one of the plurality of different types of printers based on the determination, wherein the message indicates a change to the options for the given one of the plurality of different types of printers,
send the print job message to the given one of the plurality of different types of printers, and
update a universal cloud printing protocol executed by the one or more processors when one or more of the plurality of different types of printers utilizes a newly developed content format.

11. The system of claim 10, wherein the one or more processors are further configured to:
receive a status from the given one of the plurality of different types of printers; and
automatically take a responsive action in response to receiving the status.

12. The system of claim 11, wherein the status indicates a status of the print job.

13. The system of claim 11, wherein the status indicates a status of the given one of the plurality of different types of printers.

14. The system of claim 10, wherein receiving the printer metadata comprises receiving a connection message from each of the plurality of different types of printers, each connection message including the printer metadata for the respective printer.

15. The system of claim 14, wherein the one or more processors are further configured to establish, in response to each connection message, a respective ordered bidirectional communication channel between the one or more processors and the respective printers.

16. The system of claim 15, wherein the one or more processors are further configured to initiate a firmware upgrade for the given printer over the communication channel.

17. The system of claim 10, wherein the options comprise sound.

18. The system of claim 10, wherein the printer metadata indicates content format.

* * * * *